US008813167B2

(12) United States Patent
Mantere et al.

(10) Patent No.: US 8,813,167 B2
(45) Date of Patent: Aug. 19, 2014

(54) DYNAMIC DEVICE CONFIGURATION USING PREDICATES

(75) Inventors: Jussi-Pekka Mantere, Mountain View, CA (US); Mark William Whittemore, San Jose, CA (US)

(73) Assignee: Apple Inc., Cupertino, CA (US)

( * ) Notice: Subject to any disclaimer, the term of this patent is extended or adjusted under 35 U.S.C. 154(b) by 252 days.

(21) Appl. No.: 12/982,759

(22) Filed: Dec. 30, 2010

(65) Prior Publication Data

US 2012/0173682 A1 Jul. 5, 2012

(51) Int. Cl.
*G06F 17/00* (2006.01)
*H04L 29/06* (2006.01)

(52) U.S. Cl.
USPC .............. 726/1; 709/220; 709/226; 709/223; 709/221; 719/323; 719/328

(58) Field of Classification Search
USPC ......... 709/220, 226, 168, 323, 328, 108, 223, 709/203, 224; 719/323, 328; 455/412.1; 705/35; 717/170; 726/1
See application file for complete search history.

(56) References Cited

U.S. PATENT DOCUMENTS

| | | | | |
|---|---|---|---|---|
| 5,682,529 | A * | 10/1997 | Hendry et al. | 713/100 |
| 6,289,396 | B1 * | 9/2001 | Keller et al. | 719/323 |
| 7,681,203 | B2 | 3/2010 | Mandato et al. | |
| 7,860,959 | B1 * | 12/2010 | Karpati et al. | 709/223 |
| 8,010,997 | B2 * | 8/2011 | Limont et al. | 726/3 |
| 8,024,732 | B2 * | 9/2011 | Sheehan et al. | 718/100 |
| 8,078,713 | B1 * | 12/2011 | Kim | 709/223 |
| 2006/0015431 | A1 * | 1/2006 | Bugaj et al. | 705/35 |
| 2006/0040645 | A1 * | 2/2006 | Grilli et al. | 455/412.1 |
| 2006/0135144 | A1 * | 6/2006 | Jothipragasam | 455/419 |
| 2006/0294209 | A1 * | 12/2006 | Rosenbloom et al. | 709/220 |

(Continued)

FOREIGN PATENT DOCUMENTS

WO  WO2004/040923 A1  5/2004
WO  WO 2010/115268 A1  10/2010

OTHER PUBLICATIONS

U.S. Appl. No. 10/995,633, filed, titled "Automatic Profile Selection for a Portable Wireless Network Device", by inventor Michael Bell, Filed Nov. 22, 2004, 48 pages (specification and drawings).
U.S. Appl. No. 12/756,146, filed, titled "Mobile Device Management", by inventor Gordie Freedman, Filed Apr. 7, 2010, 53 pages (specification and drawings).

(Continued)

*Primary Examiner* — Peter Poltorak
*Assistant Examiner* — Huan V Doan
(74) *Attorney, Agent, or Firm* — Womble Carlyle Sandridge & Rice, LLP (57) ABSTRACT

Methods and apparatuses that store a generic profile in a client device for configuration are described. The generic profile may include profile payloads associated with profile predicates. The profile payloads may specify a range of possible settings for configuring the client device. The profile predicates may specify which of the possible settings are applicable for the configuration according to system states of the client device. Changes in the system states may be dynamically determined during runtime. A portion of the profile payload applicable for the determined changes of the system states may be identified via associated profile predicates. As a result, the configuration of the client device may be updated for the change of the system states by applying the identified portion of the profile payload.

18 Claims, 8 Drawing Sheets

(56) References Cited

U.S. PATENT DOCUMENTS

| | | |
|---|---|---|
| 2008/0034363 A1* | 2/2008 | Jones .......................... 717/174 |
| 2008/0045172 A1 | 2/2008 | Narayanaswami et al. |
| 2008/0046996 A1* | 2/2008 | Smith et al. .................... 726/15 |
| 2008/0168267 A1 | 7/2008 | Bolen et al. |
| 2009/0313645 A1 | 12/2009 | Sathish et al. |
| 2010/0094930 A1* | 4/2010 | Griff et al. ..................... 709/203 |
| 2010/0180016 A1* | 7/2010 | Bugwadia et al. ............. 709/220 |
| 2010/0258630 A1* | 10/2010 | Shenfield et al. ......... 235/462.15 |
| 2011/0010700 A1* | 1/2011 | Lanner et al. ................. 717/170 |

OTHER PUBLICATIONS

Schilit, et al., "Context-Aware Computing Applications", 1995, pp. 85-90.IEEE.

Anonymous: Mobile phone using user-defined, location-dependent profiles, Research Disclosure, Mason Publications, Hampshire, GB, vol. 438, No. 21, Oct. 1, 2000 (Oct. 1, 2000), XP007126889, ISSN: 0374-4353.

International Search Report, International Search Application No. PCT/US2011/065870, EPO-Internal, WPI Data mailed Jul. 5, 2012.

Rob Enns, "NETCONF Configuration Protocol", Juniper Networks, Dec. 2006, pp. 1-95.

* cited by examiner

Storing a generic profile in a client device to configure the client device, the generic profile including profile payloads associated with profile predicates, the profile payloads specifying possible settings for the configuration of the client device, and the profile predicates specifying which of the possible settings are applicable for the configuration according to operating states of the client device
401

Dynamically determining a change in system states (e.g. physical location, network addresses, installation/removal of applications, user login/logout, installation/de-installation of profiles, etc.) of the client device 403

Identifying a portion of the profile payload applicable for the change of system states via the corresponding profile predicates (e.g. by applying rules or performing evaluations according to the profile predicates) 405

Applying the identified portion of profile payload to the configuration settings of the client device 407

Configuring a generic profile including profile payload (e.g. configuration settings) associated with profile predicate (e.g. conditions for selecting a portion of the configuration settings) 601

In response to receiving system states from a client device having configuration settings, identifying a portion of the profile payload associated with the received system states via the corresponding profile predicate, wherein the corresponding portion of profile predicates indicate there is a match between the identified portion of the profile payload and the system states 603

Generating a customized profile including the identified portion of the profile payload 605

Sending the customized profile to the client device to update the configuration settings of the client device with the identified portion of the profile payload 607

DYNAMIC DEVICE CONFIGURATION USING PREDICATES

FIELD OF THE INVENTION

The present invention relates generally to data processing systems. More particularly, this invention relates to dynamic device configuration using predicates based profiles.

BACKGROUND

With the increasing versatility of computing devices, configuring a device to adapt for different operating environments is becoming more and more sophisticated. For example, a device may present different user interfaces for different users, connect to different remote services at different locations, or customize parameters of an application depending on a user's preference or device administrator's requirements, etc. However, complexity in configuring the device also increases significantly at the same time and makes it harder and harder to use the device.

Typically, a configuration file may be preinstalled in a device to specify default settings for applications installed in the device. Optionally, a user interface may be provided to allow manual change of settings stored in the device. As the complexity of available settings grows, however, manual configuration may become too tedious a task for regular device users. Furthermore, most users may not be in possession of special expertise required in configuring certain applications. For managed services provided to a device, enforcing central policies may also become too costly using manual configurations.

As such, traditional configuration management to adapt operations of a device to support modern usage environments may render the device cumbersome to use, costly to maintain, difficult to manage and/or unusable for other problems.

SUMMARY OF THE DESCRIPTION

The invention enables dynamic updates of configuration settings for applications/services available in a device. The configuration settings may be adapted automatically according to a configuration profile in response to changes monitored in operating states of the device. In one embodiment, the configuration profile may include predicates (e.g. a rule set with conditions and actions) to specify how the configuration settings should be updated under various operating states. Thus, the configuration profile can ensure proper operations of the device without a user's attention to the device's working environments. In addition, an administrator may deploy the configuration profile to enforce a management policy embedded inside the configuration profile (e.g. via the predicates) in a device. Optionally, special configuration mechanisms for corresponding applications can be dynamically incorporated into the configuration profile to automatically configure these applications without requiring a user to attend to details of these mechanisms.

In one embodiment, a configuration profile may include profile predicates and profile payload (or setting data). The applicability of the profile payload may be based on dynamically determined conditions in the profile predicates. Thus, a portion of the profile payload may be active (i.e. in the configuration settings of a device) at a point in time depending on the profile predicate. The configuration profile may be self (or automatically) installed in the device (or a client machine) transparent to a user. Application of the configuration profile may active or deactivate certain payload data or settings depending on current states of the device using the profile predicates. As a result, smart device configurations for different services/applications can be performed without manual work and administrative effort.

An embodiment of the present invention can include methods and apparatuses that store a generic profile in a client device for configuration. The generic profile may include profile payloads associated with profile predicates. The profile payloads may specify a range of possible settings for configuring the client device. In one embodiment, the profile predicates may specify which of the possible settings are applicable for the configuration according to system (or operating) states of the client device. A change in the operating states of the client device may be dynamically determined during runtime. Portions of the profile payload applicable for the determined change of the system states may be identified via associated profile predicates. As a result, the configuration of the client device may be updated for the change of the system states by applying the identified portions of the profile payload.

In another embodiment, an executable may be installed in a client device for configuring an application. A predicate may be associated with the executable in a profile of the client device. One or more conditions may be specified in the predicate to select the executable for updating configuration of the application. In response to a change of an operating state of the client device, the predicate may be evaluated to determine if the conditions are satisfied according to the changed operating state. The executable may be selected for execution to update the configuration of the application if the evaluation indicates the conditions are satisfied.

In yet another embodiment, a generic profile may be configured for settings of a client device. The generic profile may include profile payloads associated with profile predicates. In response to receiving system states from the client device, a portion of the profile payloads may be identified. The identified portion of the profile payloads may be associated with a corresponding portion of the profile predicates. A match between the identified portion of the profile payload and the system states may be indicated in the corresponding portion of the profile predicates. As a result of the match, the identified portion of the profile payload may be sent to a client device to update the settings of the client device.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings in which like references indicate similar elements.

DETAILED DESCRIPTION

Method and apparatus for dynamic configurations of operations running in a device using predicates are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

An embodiment of the invention may be implemented as a method or as a machine readable non-transitory storage medium that stores executable instructions that, when executed by a data processing system, causes the system to perform a method. An apparatus, such as a data processing system, can also be an embodiment of the invention. Other features of the present invention will be apparent from the accompanying drawings and from the detailed description which follows.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s).

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device), or devices or consumer electronic products which include a multi-touch input device such as a multi-touch handheld device or a cell phone and handheld computer with a multi-touch input device.

In one embodiment, a configuration profile allows an administrator to apply configuration settings to operations of a device without the device user's attention to accommodate a variety of operating states of the device. The configuration profile may provide the flexibility for applications or system services of the device to dynamically use separate collections of settings under a variety of operating environments and/or operating states. In one embodiment, the configuration profile may include configuration data which makes an application more flexible by changing certain properties or parameters of the application without modifying and recompiling the application. An application or a service running in the device may depend on corresponding configuration settings to function properly and/or to comply with an administrative policy. Configuration settings may include, for example, user account configurations, network settings, power settings, privileges, restrictions, or other applicable hardware/software settings for applications/services.

Operating states of a device may correspond to a set of variables which can be monitored or inspected via an operating system of the device, for example, an operating state may indicate whether a particular application is running, how many applications are currently running, current date set in the device, how long a particular application has been running, an identifier of a default printer, a network IP address, device physical locations, the current active user (e.g. identifier, user group), how long the system has been running in the device, or other applicable hardware/software states, etc. An operating state may depend on an environment under which the device is operating. The environment may include, for example, various parameter values controlled outside of the device, such as which remote printer is accessible, which network is enabled, which remote server is active, or other relevant application environmental parameters etc. which may be applicable to the operations of the device.

In one embodiment, profile predicates may be evaluated to determine an update to configuration settings of a device when changes in operating states are detected in the device. The profile predicates may include a set of rules specifying whether certain conditions are satisfied to apply associated profile payloads in a configuration profile to corresponding configuration settings. In some embodiments, a condition may be evaluated by executing a piece of code. A result of the execution may include a return value of true or false (e.g. a binary value) indicating whether the condition is satisfied. Rules may be built dynamically to implement different conditions during runtime according to the configuration profile. In some embodiments, a search may be performed over the configuration profile (e.g. stored or installed profiles in the device system) to identify which profile predicates are applicable to the changes detected in the operating states. Identified profile predicates (e.g. the rule set) may include conditions to be met for applying corresponding profile payloads to the configuration settings.

For example, a condition in profile predicates may specify whether a device belongs to a certain machine model or type, whether the device has a privilege to connect to a corporate network, whether a particular network interface (e.g. an Ethernet interface) is present or installed in the device, whether the current user account belongs to a certain group (e.g. $4^{th}$ grade students in a school), whether profile data for an application is installed, or other applicable conditions, etc. Evaluation or execution of the profile predicates may determine if these conditions are satisfied. In one embodiment, specifications of the conditions may be based on variable values, such as Boolean values, a range of values, a discrete set of (e.g. string or numerical) values specified, or other applicable values.

Profile payloads may be applied to configuration settings of a device based on a result of evaluating associated profile predicates in a configuration profile. Application of the profile payloads may dynamically create new settings and/or update existing settings in the device. The profile payload may include descriptions (e.g. nomenclature, manifests, constraints, directives or other applicable specifications on settings) which can be applied (or ca activate configuration operations/services) to the configuration settings for certain applications/services (which may or may not be currently running) in the device. Optionally, the profile payload may include executable codes which may be executed to update the configuration settings.

For example, profile predicates in a configuration profile in a desktop computer of a school may require a particular pixel art application to be active and available via a user interface dock area for a user who is a $4^{th}$ grade student. Once a $4^{th}$ grade student logs in to the desktop computer, the profile predicates may be evaluated to determine if the particular pixel art application is running or not. If it is discovered that this particular application is not running and/or not present in the user interface dock area, the corresponding profile payloads may be applied to activate (e.g. with automatic application retrieval and installation) the pixel art application with a presence in the user interface dock area of a display screen of the desktop computer.

In some embodiments, profile predicates may specify that installation and/or removal of applications should be monitored to activate corresponding profile payloads to perform certain operations. For example, an installation of a first application may require that a second application is also installed and/or running. Removal of one application may trigger clean up operations, e.g. via a script code, specified in the profile payload, such as to remove an application icon deployed in a dock area in a user interface display screen.

In one embodiment, operations activated from profile payload may depend on current operating states of a device. An operating state of the device may indicate, for example, whether the device is in a sleep state (e.g. a low power state to conserve energy) or an awake state, whether a user has logged (or is currently logging) in or out of the device, user information (e.g. user privilege, group memberships), network settings, location, time, or other applicable states. In one embodiment, when detecting a new user logins in the device, a profile predicate may be evaluated to determine if the new user has a restricted privilege. A profile payload may be applied to limit capabilities of certain applications, such as changing settings of a browser application to force the browser to operate in a kios mode (i.e. without capability to store/retrieve cookies or other browser state information).

In some embodiments, a running application may be notified that its settings have been changed to retrieve and apply newly changed settings. For example, profile predicates may instruct different printers to be configured as specified in associated profile payloads based on current network settings of the device. Thus, a mobile device may be automatically and dynamically configured with different printers as the device moves form a first physical location (e.g. building A) to a second physical location (e.g. building B). Profiles related to network settings may allow a mobile phone to automatically change user interface (e.g. automatically presenting a special icon if participating in a certain wireless network), update call numbers (e.g. emergency dial number for a call button displayed on the device), or change other applicable settings. Time based operating states may enable, for example, a TV set top box device, to automatically change its parental control settings according to different time slots of the day.

In one embodiment, installation of a configuration profile may be based on a management protocol, such as MDM (Mobile Device Management) protocol, via a network connection with a profile server remotely. Alternatively or optionally, files (e.g. each application may be associated with a separate profile file) for the configuration profile may be directly (e.g. by a user) installed to a device. A profile database in the device can store application or service related profile documents to specify profile predicates and associated profile payloads.

In one embodiment, an application or service running in a device can retrieve (or read) associated configuration settings from storage locations (locally or remotely) designated for the application or service. When activated, the application or service may require access to its configuration settings before becoming fully functional. Optionally, during runtime, the application or service can re-read its configuration settings, for example, when instructed. In one embodiment, a configuration engine can update configuration settings stored in the device according to a profile database storing a configuration profile in response to changes to the configuration profile. Subsequently, the configuration engine may notify or instruct applications/services which are affected by the changes to re-read associated configuration settings.

In certain embodiments, a configuration profile may extend manageability of an application via third party plug-in components which can be dynamically attached to profile payloads in the configuration profile. Plug-in components may be executable code such as a dynamically linked library. Alternatively, plug-in components may be activated via API (Application Programming Interface) calls to the application. Configuration mechanisms which are proprietary to an application and/or too complicated to manage may be enabled via the plug-in components. Thus, an application may directly participate in its own configuration via the plug-in mechanism in the configuration profile.

For example, a photo graphics application running in a device may be configured to operate under different color space settings. Instead of explicitly specifying configuration settings for the photo graphics application, a configuration profile installed in the device may include a plug-in component which implements the update of the configurations settings according to a required color space, e.g. approved by a corporate policy, which may be specified in profile predicates in the configuration profile. In one embodiment, the installation of the photo graphics application to a device may activate the plug-in component via profile payload associated with the profile predicates to configure the photo graphics application. Thus, knowledge built in the plug-in internal to the provider of the photo graphics application to configure its settings for the required color space can be dynamically applied for configuring the device.

In one embodiment, a profile server may deploy configuration profiles for configuring client devices. Depending on operating states received from a device, the profile server may dynamically build a customized profile for the device. In some embodiments, the profile sever may serve (or send) a default profile to the device without a need to access current operation states of the device. Alternatively or optionally, the profile server may receive operating states, which may be limited in scope (e.g. without all the details or facts of settings and/or states), from the device to determine which profile predicates and payload to include in the configuration profile for the client. A default profile may be an initial profile for the device. In some embodiments, each device may be configured to allow a management server or a profile server to distribute the initial profile to the device. Activation of the initial profile may be initiated at the device or from the profile server. For example, the initial profile may be activated if a predicate included in the profile is satisfied at the device.

A profile server may include settings (e.g. administer configured) which may be joined with the operating states from a device to generate a configuration profile as a joint profile. The profile server may control the joint profile in the device to, for example, install/remove applications to/from the device. In one embodiment, the profile server may receive changes in operating states from the device to compose an update of the configuration profile for the device, such as making new rules as profile predicates for the update. Deployment of the configuration profile from the profile server may be based on MDM protocol, email protocol, or other applicable communication or message protocols.

In one embodiment, the profile server may push down a policy for managing operations of client devices via configuration profiles sent to the devices. Optionally, a configuration profile may include location references to storages, such as directory servers, to allow the profile server to propagate changes of the policy to the devices via updates of the references storages. Examples of the policy may include, but not limited to, for example, whether an application is allowed, required, or prohibited by a user of a certain group (e.g. a sixth grader student), which VPN (Virtual Private Network) settings to use, which certificates to apply, which applications should be installed, which web sites are accessible, restrictions of users authorized to use the device, which services from remote servers are available/allowed (e.g. contact servers, mail servers, print servers, message servers etc.), or other applicable policy specifications.

In one embodiment, an administrator may update a profile server (e.g. as a central server) with new profile predicates to revise an existing policy included in a configuration profile. For example, a profile predicate in the existing policy may indicate that if a device is physically located in a certain building, a first printer should be configured as a default printer for the device. Subsequently, a second printer may be installed in the building to replace the first printer. As a result, the profile predicate may be updated to specify that the newly installed second printer should be configured as the default printer in place of the first printer for a device located in the building. The profile server may push an updated configuration profile with the updated profile predicate to each client device in the building to allow automatic changes of printer settings in each client device. The updated configuration profile may include payloads with configuration data or code for the second printer.

Figure 1:
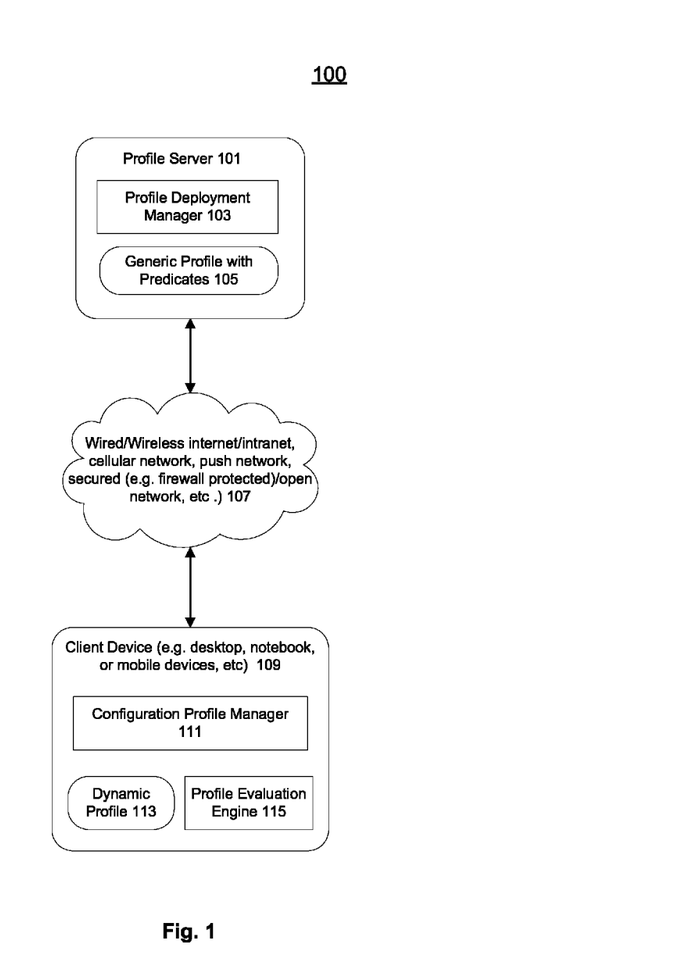
FIG. 1 is a block diagram illustrating one embodiment of networked systems for dynamic device configuration with predicates.

FIG. 1 is a block diagram illustrating one embodiment of networked systems for dynamic device configuration with predicates. Networked systems 100 may include one or more servers (or hosts), such as profile server 101, coupled to one or more devices, such as client device 109, via networks 107. In one embodiment, network 107 may allow communication channels or network connections (e.g. for pushing a configuration profile) to be established between profile server 101 and client device 109 via the open Internet, an intranet, firewall protected secure networks, wide area cellular networks (e.g. a 3G network), or other applicable networks, etc. Networks 107 may be wired, wireless (such as Wi-Fi, Bluetooth etc), or a combination of both.

Profile server 101 may include profile deployment manager 103 which deploys configuration profiles based on generic profile 105 to client devices, such as device 109. Generic profile 105 may specify how operations (e.g. in applications and/or services) of a client device should be configured under a plurality of operating states or environments of the client device. For example, a configuration profile deployed to client device 109 may be customized from generic profile 105 according to client data representing operations states and/or environments received from client device 109.

In one embodiment, client device 109 may be a mobile device, a desktop computer, a notebook computer or other client machines running applications and/or services configured according to configuration settings. Configuration profile manager 111 can maintain the configuration settings according to dynamic profile 113 which may include predicates and/or executable codes to specify how the settings should be specified under different operating states of client device 109. For example, when changes in the operating states of the client device 109 are detected, configuration profile manager 111 can perform operations to evaluate the predicates or execute the executable codes to update the configuration settings.

Figure 2:
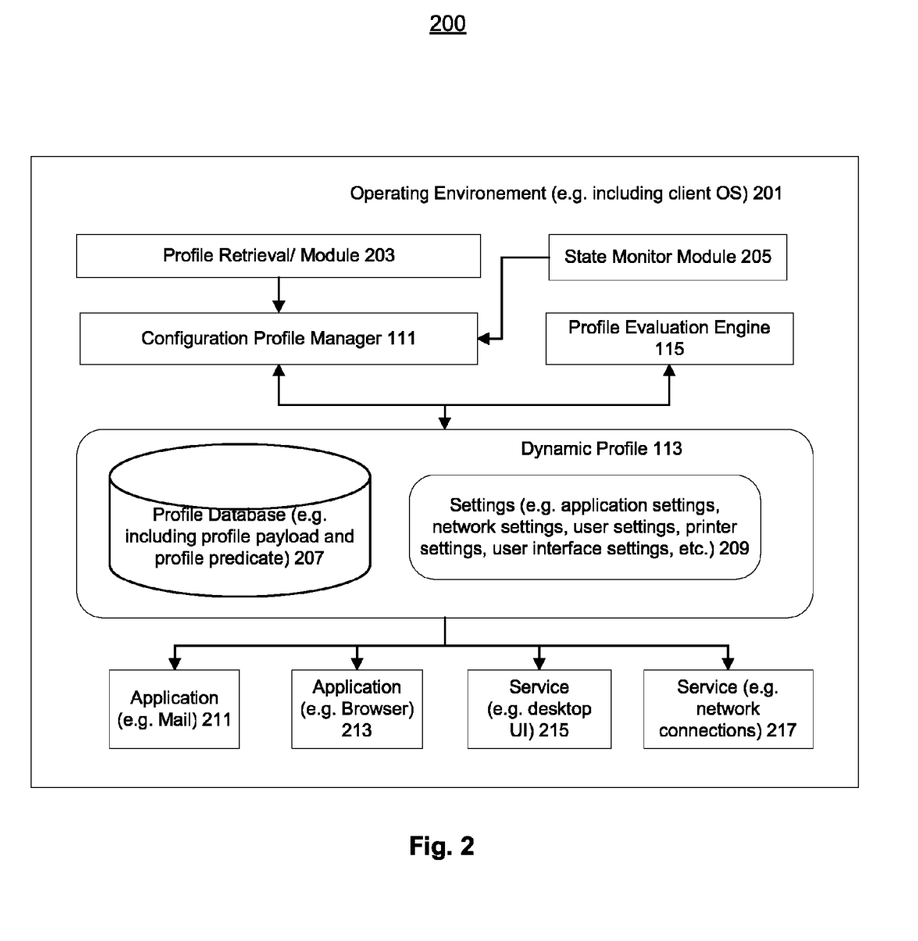
FIG. 2 is a block diagram illustrating an exemplary system having a dynamic profile for configuration according to embodiments described herein.

FIG. 2 is a block diagram illustrating an exemplary system having a dynamic profile for configuration according to embodiments described herein. For example, operating environment 201 may support configuration settings for device 109 of FIG. 1. In one embodiment, configuration profile manager 111 can maintain dynamic profile 113 which provides settings to configure processes installed and/or running in a device, such as mail application 211, browser application 213, UI service 215, network service 217, or other applicable user/system level processes. Each application/service may retrieve or read corresponding configuration settings, for example, from settings 209 already specified in the application/service. For example, mail application 211 may require settings of network addresses or identifiers for a mail delivery server, such as SMTP (Simple Mail Transfer Protocol) server, and/or a mail retrieval server, such as IMAP (Internet Message Access Protocol) for sending and/or receiving email messages. An application may determine its settings when starting up. Optionally, an application may dynamically re-read its settings, for example, when notified by configuration profile manager 111.

Dynamic profile 113 may include settings 209 which can be located within a device or outside of the device (e.g. locally or remotely coupled). An application may be associated with a unique identifier for locating its corresponding settings from settings 209. Alternatively, an application may locate (e.g. following a directory search path) a built in named file (e.g. identified in source code of the application) for its settings. Settings 209 may include hardware, software or other settings required for the operations of associated device. For example, settings 209 may store network settings (e.g. IP addresses for network gateway, network access certificates, etc.), user settings for a current active user (e.g. group identifier, user identifier, etc.), printer settings (e.g. default printer, active printers, etc.), user interface settings (e.g. default application icons present in a screen area, font size, background color, etc.), power setting, or other settings.

In one embodiment, dynamic profile 113 may include profile database 207 storing profiles retrieved or received from a profile server, such as server 101 of FIG. 1. Profiles may include profile predicates associated with profile payload. In one embodiment, profile payload may represent possible configuration values to configure in settings 113. Profile predicates may be evaluated to determine which setting data specified in the corresponding profile payload should be applied to settings 113, for example, according to operating states of a device.

In particular, profile predicates may include one or more rules having conditions represented as logical relationships (e.g. based on logical AND, OR operations) among one or more operating states of the device. Alternatively, profile predicates may include executables having meta data, for example, describing which applications/services and/or which operating states are relevant to the profile predicates. Profile predicates and/or profile payload may be indexed in profile database 207 to allow efficient selection of profile predicates for evaluation, such as, according to operating states of the device and/or identifiers of applications/services.

Configure profile manager 111 may update dynamic profile 113 in response to newly received profiles and/or changes in operating states or operating environments of a device. Optionally, configure profile manager 111 may retrieve profiles, for example, based on a user request and/or automatic periodic updates. In one embodiment, profile retrieval module 203 may establish a network connection with a profile server, such as profile server 101 of FIG. 1, to receive default profiles or updated profiles. For example, an updated profile may be based on a change in configuration policy and/or operating environment (e.g. newly installed active printers) for the device. Configuration profile manager 111 may parse contents from received profiles as profile predicates and profile payload to update profile database 207.

In one embodiment, configuration profile manager 111 may register (e.g. via an operating system) one or more operating states of a device for updating settings 209. Operating states may be parameters describing operations of the device which an operating system, such as operating environment 201, can detect and/or measure. Configuration profile manager 111 can identify which operating states to monitor according profile predicates stored in profile database 207. In one embodiment, state monitor module 205 may constantly monitor changes of registered operating states. State monitor module 205 can notify configuration profile manager 111 when changes in monitored operating states occur. In response, configuration profile manager 111 may activate profile evaluation engine 115 to determine how settings 209 should be updated for the changes in operating states based on profile information stored in profile database 207.

Profile evaluation engine 115 may identify profile predicates relevant to detected changes of operating states (e.g. based on matches between detected operating states and profile predicates). For example, profile evaluation engine 115 may include production rule engine to perform inference operations on relevant profile predicates to determine or select a portion of associated profile payload (e.g. when a predicate is evaluated to be true) for updating settings 209. Profile evaluation engine 115 may execute executables in the relevant profile predicates which can return a value, for example, for the selection of applicable profile payload. Configuration profile manager 111 may receive a result of evaluation of profile predicates from profile evaluation engine 115 to update settings 209. In one embodiment, configuration profile manager 111 may include specifications on where and how an application retrieves its settings from settings 209, e.g. based on specific local or remote locations, for the update.

Figure 3:
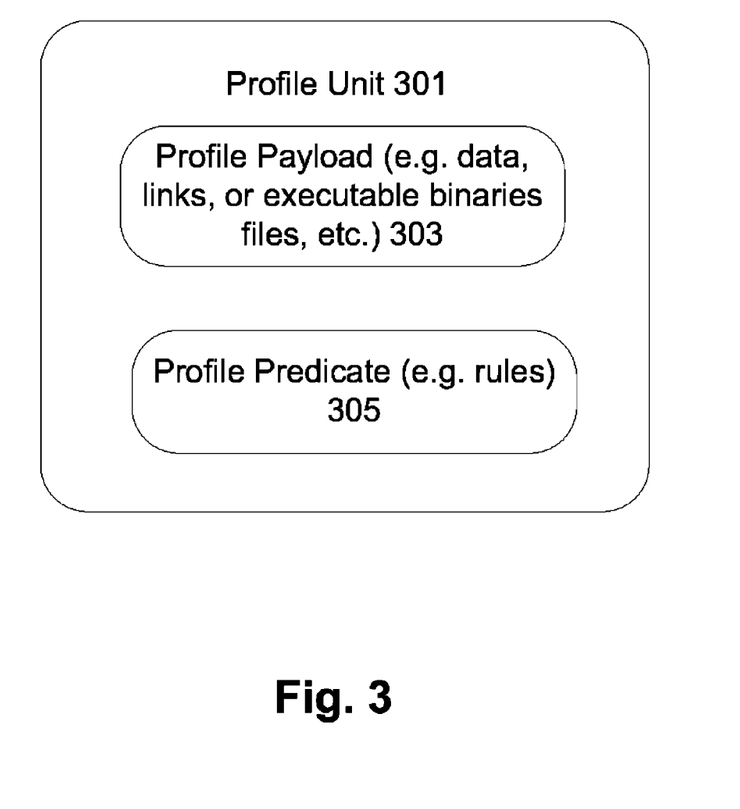
FIG. 3 is a diagram illustrating an exemplary data unit including profile payloads and profile predicates according to the embodiments described herein.

FIG. 3 is a diagram illustrating an exemplary data unit including profile payloads and profile predicates according to the embodiments described herein. For example, profiles received from profile server 101 of FIG. 1 may include one or more profile units 301 as pairs of profile payload 303 associated with profile predicate 305. Profile predicate 305 may be evaluated to determine how profile payload 303 can be applied to update settings, such settings 209 of FIG. 2. Profile payload 303 may include data (or values) to be updated directly on settings, such as settings 209 of FIG. 2. Alternatively or optionally, profile payload 303 may include an executable binary data capable of updating the settings when executed. In one embodiment, predicate payload may include references or links to data or executables (e.g. stored in a remote server) for updating the settings. Profile predicate 305 may include rules or other executables which can be evaluated based on operating states of a device.

Figure 4:
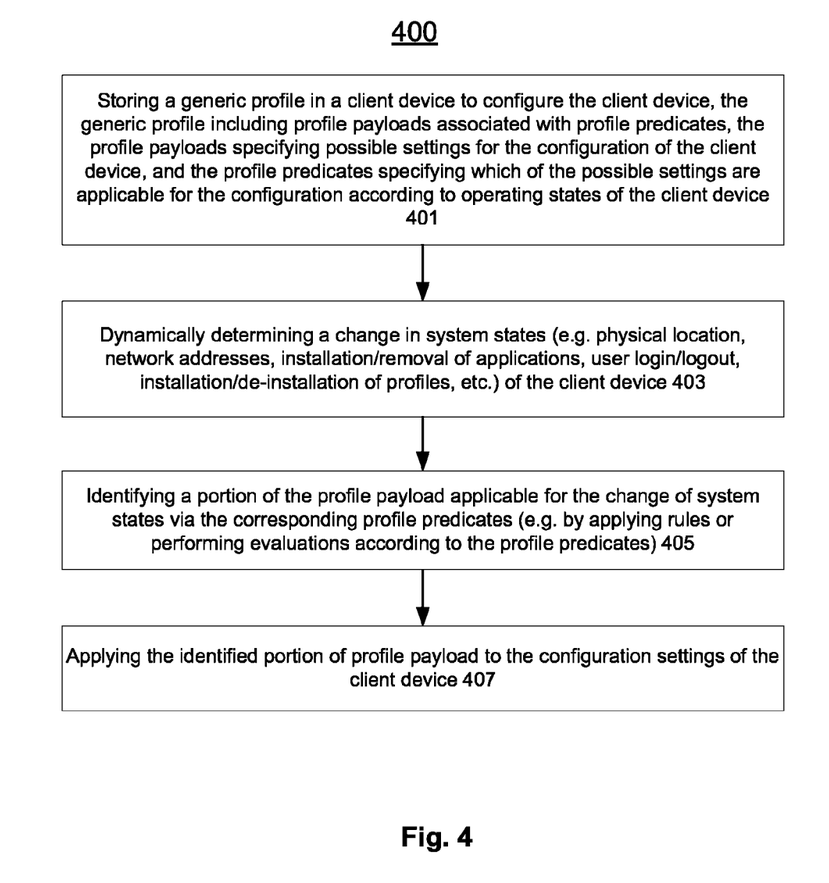
FIG. 4 is a flow diagram illustrating one embodiment of a process to dynamically configure a device according to the embodiments described herein.

FIG. 4 is a flow diagram illustrating one embodiment of a process to dynamically configure a device according to the embodiments described herein. Exemplary process 400 may be performed by a processing logic that may comprise hardware (circuitry, dedicated logic, etc.), software (such as is run on a dedicated machine), or a combination of both. For example, process 400 may be performed by some components of system 100 of FIG. 1. At block 401, the processing logic of process 400 can store a generic profile in a client device to configure the client device. A generic profile may spell out how the client device should be configured under different operating states or environments. The generic profile can include profile payloads associated with profile predicates. For example, the profile payloads may specify possible settings for configuring the client device. The profile predicates may include constrains, rules or executables for selecting which of the possible settings to apply for the configurations of the client device according to operating states of the client device.

At block 403, in one embodiment, the processing logic of process 400 may dynamically determine or detect a change in system states (or operating states) of a client device. The change may be detected when the device moves to a physical location, the device binds to different network addresses, applications are installed/de-installed in/from the device, applications are activated (e.g. running) or de-activated (e.g. exiting) in the device, a user logs in or logs out of the device, a profile is installed to or de-installed from the device, or other applicable events occur in the device, etc.

In response, the processing logic of process 400 may identify a portion of profile payloads from a stored profile applicable for determined changes in system states of a device at block 405. For example, the portion of the profile payloads may be selected according to results of evaluating corresponding profile predicates (e.g. based on rules in the profile predicates) in the stored profile according to the changed system states of the device. At block 407, the identified portion of profile payloads may be applied to configuration settings of the device to reflect the changes in the system states.

Figure 5:
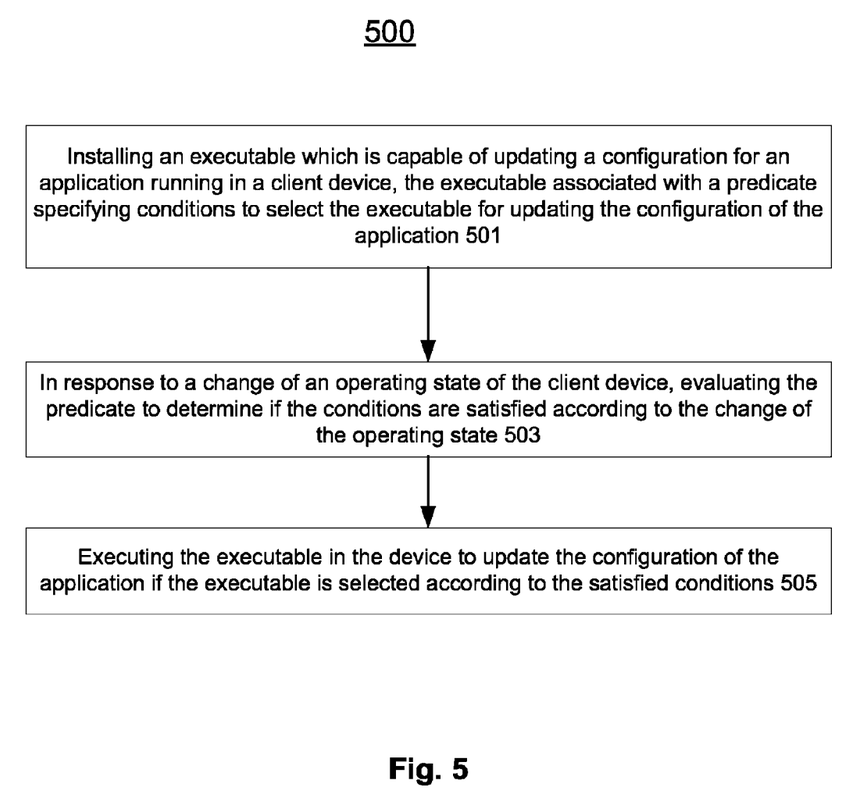
FIG. 5 is a flow diagram illustrating one embodiment of a process to configure an application via an executable according to the embodiments described herein.

FIG. 5 is a flow diagram illustrating one embodiment of a process to configure an application via an executable according to the embodiments described herein. Exemplary process 500 may be performed by a processing logic that may comprise hardware (circuitry, dedicated logic, etc.), software (such as is run on a dedicated machine), or a combination of both. For example, process 500 may be performed by some components of system 100 of FIG. 1. At block 501, the processing logic of process 500 can install an executable which is capable of updating a configuration in a client device for an application running in the device. The executable may be associated with a predicate which specifies conditions to select the executable for updating the configuration of the application.

At block 503, in one embodiment, the processing logic of process 500 may evaluate a predicate associated with an executable for configuring an application of a device in response to a change of an operating state of the device. The application and the executable for configuring the application may be separately installed to the device from a third party providing the application. In one embodiment, the predicate may include conditions in terms of operating states of the device to determine if conditions are satisfied to select the executable to configure the application according to the changed operating state. If the executable is selected, at block 505, the executable may be executed to update the configuration of the application in the device.

Figure 6:
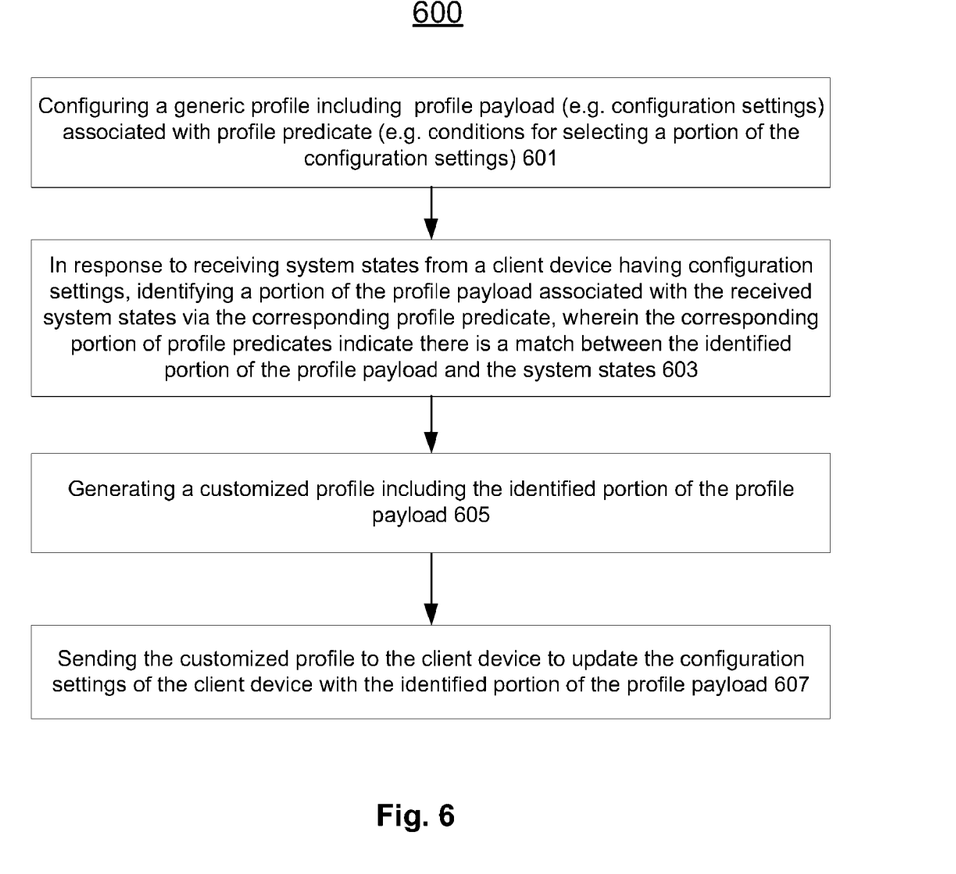
FIG. 6 is a flow diagram illustrating one embodiment of a process to remotely configure client devices using predicates according to the embodiments described herein.

FIG. 6 is a flow diagram illustrating one embodiment of a process to remotely configure client devices using predicates according to the embodiments described herein. Exemplary process 600 may be performed by a processing logic that may comprise hardware (circuitry, dedicated logic, etc.), software (such as is run on a dedicated machine), or a combination of both. For example, process 600 may be performed by some components of system 100, such as server 101, in FIG. 1. At block 601, the processing logic of process 600 can configure a generic profile including profile payload (e.g. configuration settings) associated with profile predicate (e.g. conditions for selecting a portion of the configuration settings). The configuration may be based a user interface allowing, for example, an administrator, to install/update contents of the generic profile to manage configurations of multiple client devices.

At block 603, in one embodiment, the processing logic of process 600 may receive system states from a client device (e.g. remotely connected) dynamically associated with configuration settings. In response, the processing logic of process 600 may identify a portion of profile payload in a generic profile for the received system states. For example, the processing logic of process 600 can determine whether there is a match between the identified portion of the profile payload and the system states by evaluating a corresponding portion of profile predicate for the identified profile payload.

At block 605, the processing logic of process 600 may generate a customized profile including a portion of profile payload identified from a default profile for a client device according to system states received from the device. Subsequently at block 607, the processing logic of process 600 may send the customized profile to the client device to update configuration settings of the client device with the identified portion of the profile payload, e.g. based on MDM protocol.

Figure 7:
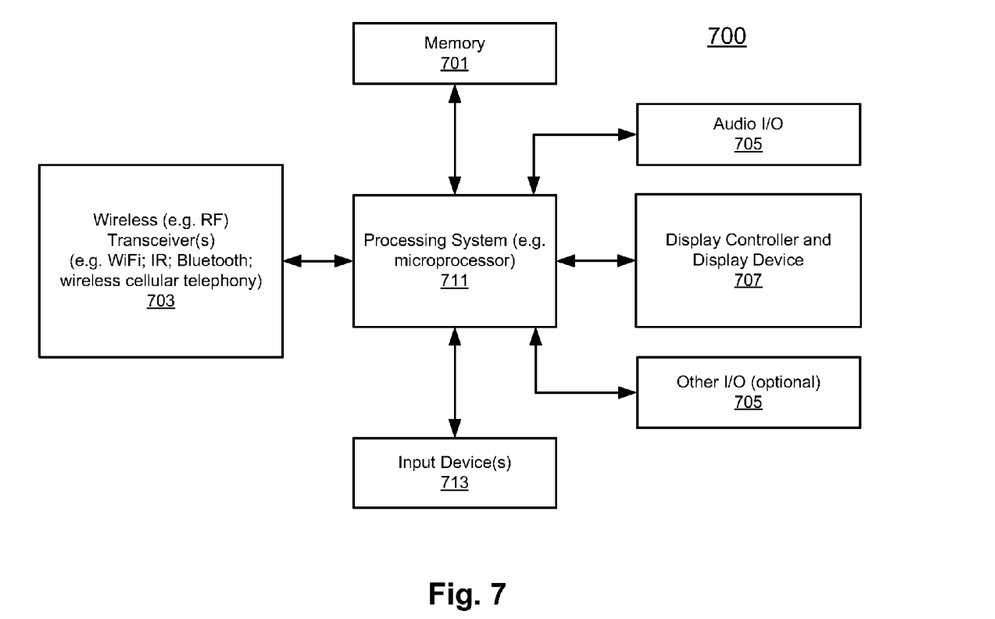
FIG. 7 shows one example of a data processing system which may be used with the embodiments described herein.

FIG. 7 shows one example of a data processing system which may be used with the embodiments described herein. The data processing system 700 shown in FIG. 7 includes a processing system 711, which may be one or more microprocessors, or which may be a system on a chip integrated circuit, and the system also includes memory 701 for storing data and programs for execution by the processing system. The system 700 also includes an audio input/output subsystem 705 which may include a microphone and a speaker for, for example, playing back music or providing telephone functionality through the speaker and microphone. The system 700 can, in at least certain embodiments, request the one or more profiles described herein and download those profiles to configure the device for communication through a network. The system 700 can download those profiles from a server data processing system such as server 101 of FIG. 1. In one embodiment, the system 700 may be the device 109 shown in FIG. 1.

A display controller and display device 707 provide a visual user interface for the user; this digital interface may include a graphical user interface which is similar to that shown on a Macintosh computer when running OS X operating system software. The system 700 also includes one or more wireless transceivers 703 to communicate with another data processing system. A wireless transceiver may be a WiFi transceiver, an infrared transceiver, a Bluetooth transceiver, and/or a wireless cellular telephony transceiver. It will be appreciated that additional components, not shown, may also be part of the system 700 in certain embodiments, and in certain embodiments fewer components than shown in FIG. 7 may also be used in a data processing system.

The data processing system 700 also includes one or more input devices 713 which are provided to allow a user to provide input to the system. These input devices may be a keypad or a keyboard or a touch panel or a multi touch panel. The data processing system 700 also includes an optional input/output device 715 which may be a connector for a dock. It will be appreciated that one or more buses, not shown, may be used to interconnect the various components as is well known in the art. The data processing system shown in FIG. 7 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 700 may be a network computer or an embedded processing device within another device, or other types of data processing systems which have fewer components or perhaps more components than that shown in FIG. 7.

Figure 8:
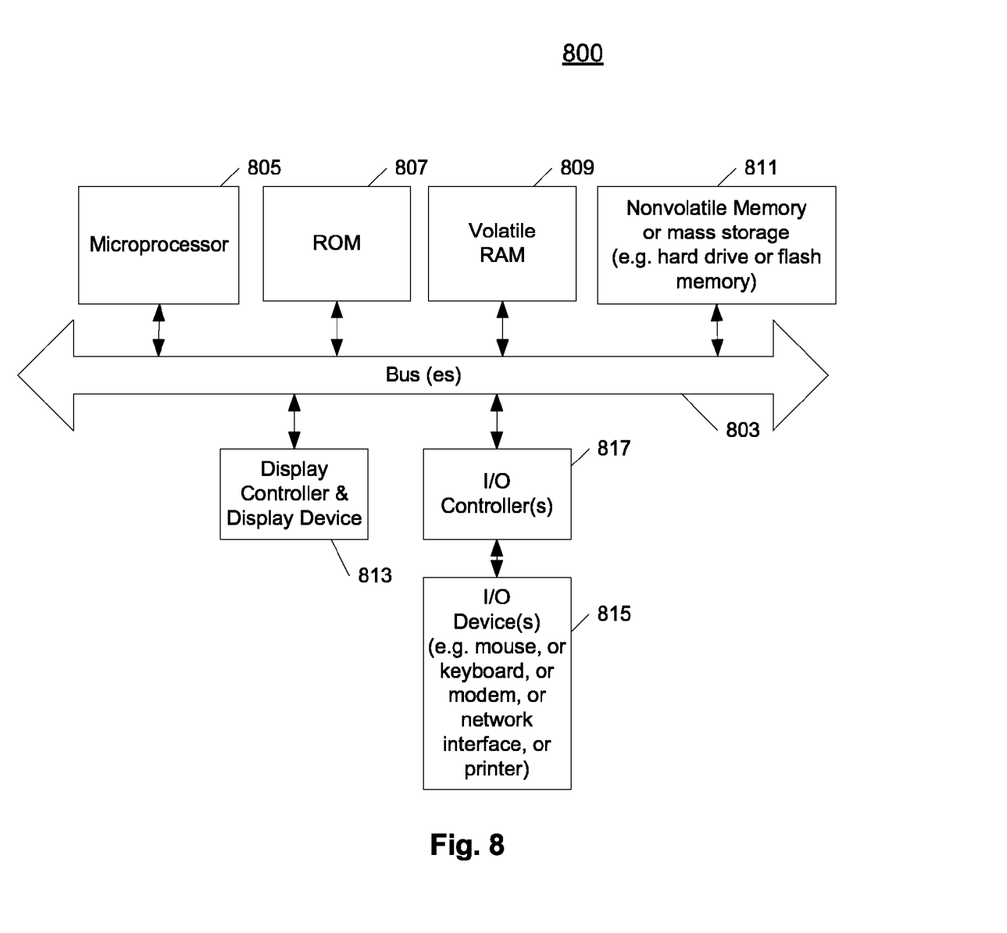
FIG. 8 illustrates an example of a typical computer system which may be used in conjunction with the embodiments described herein.

FIG. 8 illustrates an example of a typical computer system which may be used in conjunction with the embodiments described herein. Note that while FIG. 8 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. FIG. 8 may represent the server system shown in FIG. 1.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 813 and to peripheral devices such as input/output (I/O) devices which may be mice, keyboards, modems, network interfaces, printers and other devices which are well known in the art. Typically, the input/output devices 815 are coupled to the system through input/output controllers 817. The volatile RAM (Random Access Memory) 809 is typically implemented as dynamic RAM (DRAM) which requires power continually in order to refresh or maintain the data in the memory.

The mass storage 811 is typically a magnetic hard drive or a magnetic optical drive or an optical drive or a DVD RAM or a flash memory or other types of memory systems which maintain data (e.g. large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method, comprising:
at a client device:
storing a generic profile, the generic profile including a plurality of profile payloads and a plurality of profile predicates, wherein:
each profile payload specifies different configuration settings for the client device, and
each profile predicate defines at least one condition that, when satisfied based on changes in a system state of the client device, causes at least one of the plurality of profile payloads to be applied to the client device;
identifying a change in the system state of the client device;
transmitting, to a manager server, information associated with the change in the system state; and
in response to transmitting:
receiving, from the manager server, an update to the generic profile, wherein the update includes a customized profile payload and a customized profile predicate that are each customized based on the information about the change in the system state,
dynamically determining the change in the system state satisfies conditions defined by the customized profile predicate, and
automatically, and without user intervention:
updating, via an executable included in the identified customized profile payload, a configuration of the client device based on the configuration settings specified by the customized profile payload, wherein the configuration settings are implicitly specified in the executable, and the updating is based on an Application Programming Interface (API) call including parameters for the system state.

2. The method of claim 1, wherein the manager server is remotely coupled to the client device, and the generic profile is provided by the manager server.

3. The method of claim 2, wherein the generic profile is associated with a version and the system state includes the version of the generic profile.

4. The method of claim 1, wherein the system state includes how long an application has been installed in the client device, and the update of the configuration of the client device causes the installed application to be removed from the client device.

5. The method of claim 1, wherein each profile predicate of the plurality of profile predicates implements a set of rules, and the identification is based on matching operations between the change in the system state and the set of rules.

6. The method of claim 1, wherein each of the plurality of profile predicates is configured to call an API having input parameters associated with the change in the system state.

7. A non-transitory computer readable storage medium configured to store instructions that, when executed by a processor included in a client device, cause the client device to:
store a generic profile in the client device, the generic profile including a plurality of profile payloads and a plurality of profile predicates, wherein:
each profile payload specifies different configuration settings for the client device, and
each profile predicate defines at least one condition that, when satisfied based on changes in a system state of the client device, causes at least one of the plurality of profile payloads to be applied to the client device;
dynamically identify a change in the system state of the client device;
transmit, to a manager server, information associated with the change in the system state; and
in response to transmitting:
receive, from the manager server, an update to the generic profile, wherein the update includes a customized profile payload and a customized profile predicate that are each customized based on the information about the change in the system state,
dynamically determining the change in the system state satisfies conditions defined by the customized profile predicate, and
automatically, and without user intervention:
update, via an executable included in the identified customized profile payload, a configuration of the client device based on the configuration settings specified by the customized profile payload, wherein the configuration settings are implicitly specified in the executable, and the updating is based on an Application Programming Interface (API) call including parameters for the system state.

8. The non-transitory computer readable storage medium of claim 7, wherein the manager server is remotely coupled to the client device, and the generic profile is provided by the manager server.

9. The non-transitory computer readable storage medium of claim 8, wherein the generic profile is associated with a version and the system state includes the version of the generic profile.

10. The non-transitory computer readable storage medium of claim 7, wherein the system state includes how long an application has been installed in the client device, and the update of the configuration of the client device causes the installed application to be removed from the client device.

11. The non-transitory computer readable storage medium of claim 7, wherein each profile predicate of the plurality of profile predicates implements a set of rules, and the identification is based on matching operations between the change in the system state and the set of rules.

12. The non-transitory computer readable storage medium of claim 7, wherein each of the plurality of profile predicates is configured to call an API having input parameters associated with the change in the system state.

13. A computer system, comprising:
a memory; and
a processor, wherein the processor is configured to execute instructions stored in the memory that cause the computer system to:
store a generic profile in a client device, the generic profile including a plurality of profile payloads and a plurality of profile predicates, wherein:
each profile payload specifies different configuration settings for the client device, and
each profile predicate defines at least one condition that, when satisfied based on changes in a system state of the client device, causes at least one of the plurality of profile payloads to be applied to the client device;
identify a change in the system state of the client device;
transmit, to a manager server, information associated with the change in the system state; and
in response to transmitting:
receive, from the manager server, an update to the generic profile, wherein the update includes a customized profile payload and a customized profile predicate that are each customized based on the information about the change in the system state,
dynamically determine the change in the system state satisfies conditions defined by the customized profile predicate, and
automatically, and without user intervention:
update, via an executable included in the identified customized profile payload, a configuration of the client device based on the configuration settings specified by the customized profile payload, wherein the configuration settings are implicitly specified in the executable, and the updating is based on an Application Programming Interface (API) call including parameters for the system state.

14. The system of claim 13, wherein the manager server is remotely coupled to the client device, and the generic profile is provided by the manager server.

15. The system of claim 14, wherein the generic profile is associated with a version and the system state includes the version of the generic profile.

16. The system of claim 13, wherein the system state includes how long an application has been installed in the client device, and the update of the configuration of the client device causes the installed application to be removed from the client device.

17. The system of claim 13, wherein each profile predicate of the plurality of profile predicates implements a set of rules, and the identification is based on matching operations between the change in the system state and the set of rules.

18. The system of claim 13, wherein each of the plurality of profile predicates is configured to call an API having input parameters associated with the change in the system state.

* * * * *